United States Patent [19]

Mercado

[11] Patent Number: 4,712,886
[45] Date of Patent: Dec. 15, 1987

[54] LENS DOUBLET COLOR-CORRECTED FOR VISIBLE AND NEAR-INFRARED WAVELENGTHS

[75] Inventor: Romeo I. Mercado, San Jose, Calif.

[73] Assignee: Lockheed Missiles & Space Company, Inc., Sunnyvale, Calif.

[21] Appl. No.: 931,003

[22] Filed: Nov. 14, 1986

Related U.S. Application Data

[63] Continuation of Ser. No. 676,492, Nov. 29, 1984, abandoned.

[51] Int. Cl.⁴ .................................................. G02B 3/00
[52] U.S. Cl. ..................................... 350/482; 350/481
[58] Field of Search ........................ 350/481, 482, 463

[56] References Cited

PUBLICATIONS

Optical Society of America Journal; Mercado et al; vol. 71, 10-30-1981, pp. 1638-1639; vol. 72, 10-19-1982, p. 1725.

*Primary Examiner*—John K. Corbin
*Assistant Examiner*—Paul Dzierzynski
*Attorney, Agent, or Firm*—John J. Morrissey

[57] ABSTRACT

A lens doublet comprising a positive lens element made of calcium fluoride crystal and a negative lens element made of Schott infrared transmitting glass IRGN6 enables an object to be imaged at four wavelengths in the visible region, or at four wavelengths in the near-infrared region, or at five wavelengths in a band extending from the visible to the near-infrared region of the electromagnetic spectrum. The doublet has practically negligible secondary and higher-order spectra throughout these spectral regions.

10 Claims, 6 Drawing Figures

FIG_1
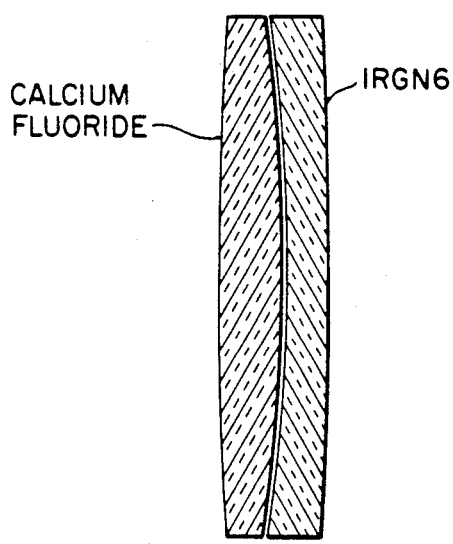
FIG_2
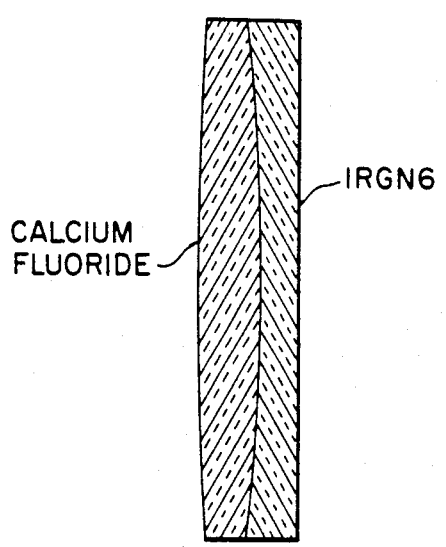
FIG_3
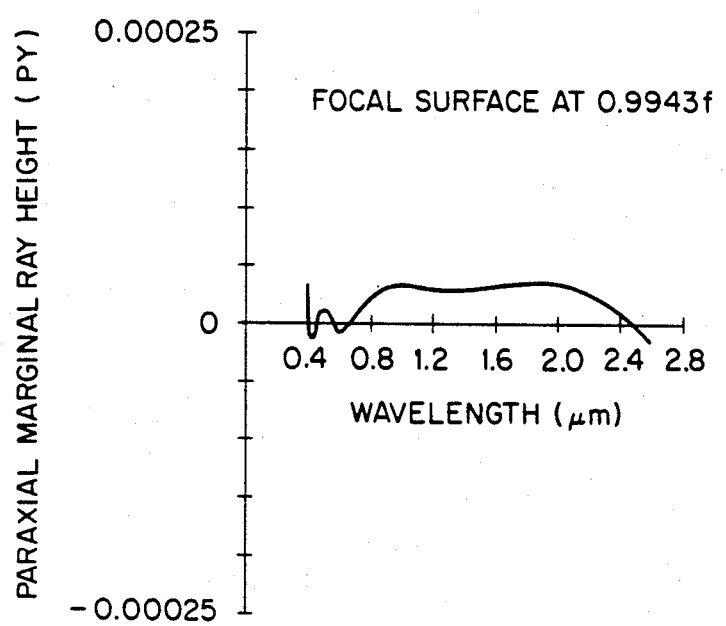

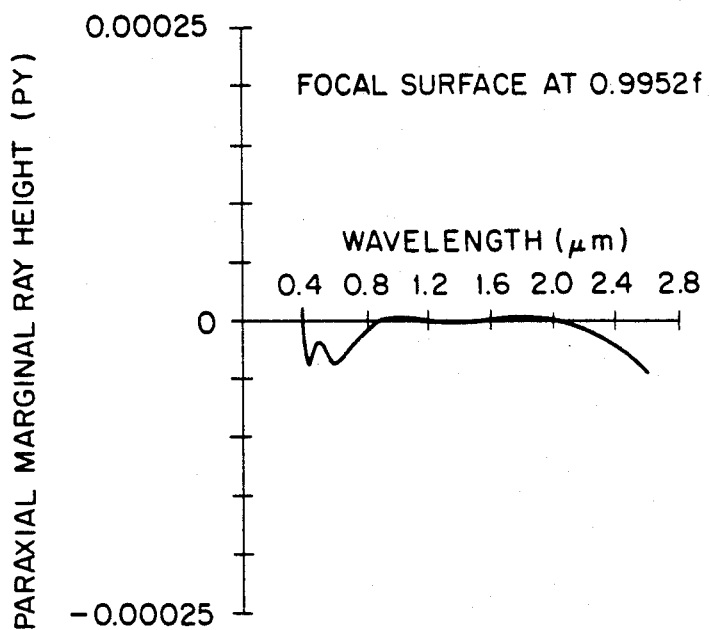
FIG 4
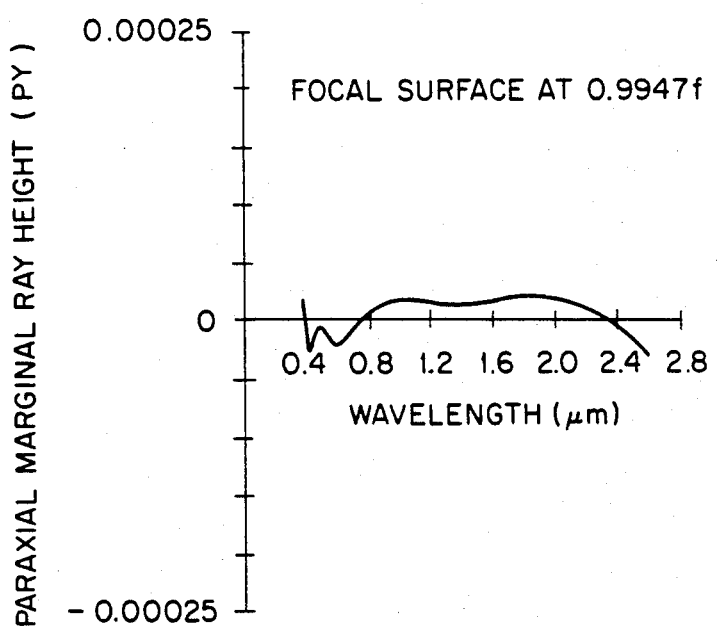
FIG_5

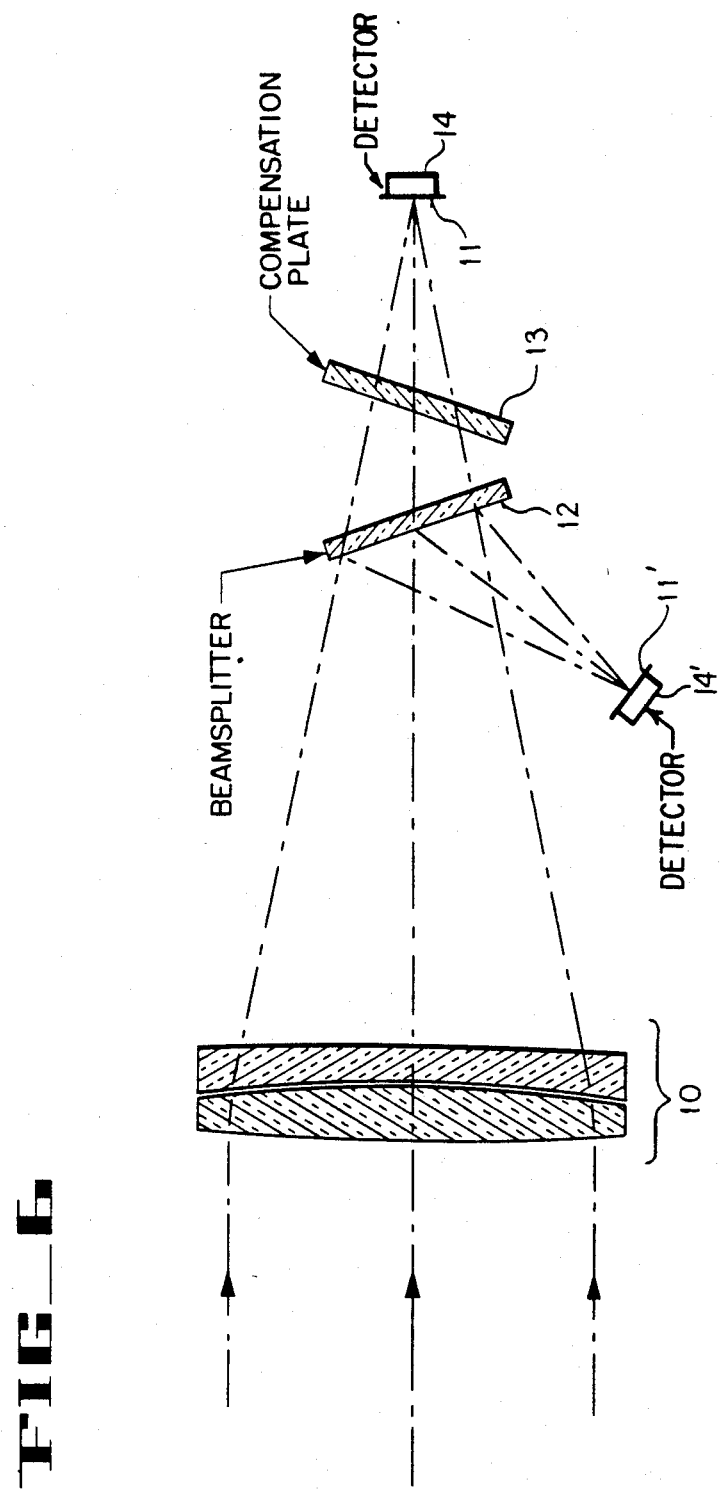
FIG_6

LENS DOUBLET COLOR-CORRECTED FOR VISIBLE AND NEAR-INFRARED WAVELENGTHS

This application is a continuation of application Ser. No. 676,492 filed Nov. 29, 1984, and now abandoned.

TECHNICAL FIELD

This invention relates generally to apparatus for imaging an object in either the visible, the near-infrared, or simultaneously in both the visible and the near-infrared regions of the electromagnetic spectrum.

BACKGROUND OF THE INVENTION

A method of selecting optical materials for use in designing color-corrected optical systems was disclosed in co-pending U.S. patent application Ser. No. 419,705, which is incorporated herein by reference.

SUMMARY OF THE INVENTION

An apparatus according to the present invention comprises a lens doublet, which is capable of imaging an object at four wavelengths in the visible region (i.e., 0.4 to 0.7 micron), or at four wavelengths in the near-infrared region (i.e., 0.7 to 2.5 microns), or at five wavelengths from the visible to the near-infrared region (i.e., 0.4 to 2.5 microns) of the electromagnetic spectrum. Furthermore, the lens doublet of the present invention has practically negligible secondary and higher-order spectra throughout these spectral regions.

One lens element of the doublet of the present invention is made from calcium fluoride ($CaF_2$) crystal, and the other lens element of the doublet is made from infrared transmitting glass marketed by Schott Optical Glass, Inc. of Dua, Pennsylvania under catalog number IRGN6. (See Schott Publication No. 3112/1e, May 1982, entitled "Infrared-Transmitting Glasses".) The optical prescription for the doublet specifies lens elements that can be readily fabricated by conventional techniques. The optical prescription can be scaled up or down over a relatively wide range of focal distances without increasing monochromatic and chromatic aberrations to an unacceptable extent.

DESCRIPTION OF THE DRAWING

FIG. 1 is a profile drawing of an air-spaced lens doublet according to the present invention.

FIG. 2 is a profile drawing of a cemented lens doublet according to the present invention.

FIG. 3 is a plot of paraxial marginal ray height versus wavelength for the lens doublet of FIG. 1, for unit focal length at $\lambda_0 = 0.54607$ micron and a relative aperture of f/15, at a focal position that provides color correction at four visible wavelengths and one infrared wavelength.

FIG. 4 is a plot of paraxial marginal ray height versus wavelength for the lens doublet of FIG. 1, for unit focal length at $\lambda_0 = 0.54607$ micron and a relative aperture of f/15, at a focal position that provides color correction at one visible wavelength and four infrared wavelengths.

FIG. 5 is a plot of paraxial marginal ray height versus wavelength for the lens doublet of FIG. 1, for unit focal length at $\lambda_0 = 0.54607$ micron and a relative aperture of f/15, at a focal position that provides color correction at three wavelengths in the band from 0.4 to 2.5 microns.

FIG. 6 is a schematic profile drawing of an optical system embodying the lens doublet of FIG. 1 and means for simultaneously detecting images in both the visible and the infrared wavelength regions.

BEST MODE OF CARRYING OUT THE INVENTION

FIG. 1 illustrates an air-spaced lens doublet according to the present invention scaled for unit focal length at $\lambda_0 = 0.54607$ micron and a relative aperture of f/15. The lens doublet of FIG. 1 comprises a positive lens element made of calcium fluoride ($CaF_2$) crystal and a negative lens element made of Schott infrared transmitting glass IRGN6. The design form of the lens doublet of FIG. 1 is specified in tabular format as follows:

TABLE I

| Surface No. | Radius | Thickness | $N_e$ | $V_e$ | Material |
|---|---|---|---|---|---|
| 1 | .5492 f | .00750 f | 1.4350 | 95.06 | $CaF_2$ |
| 2 | −.2652 f | .00025 f | | | Air |
| 3 | −.2782 f | .00500 f | 1.5915 | 54.8 | IRGN6 |
| 4 | −.8512 f | | | | | where the lens element surfaces of the doublet are numbered consecutively from left to right in accordance with conventional optical design practice. The "radius" listed for each surface is the radius of curvature of the surface expressed as a multiple of the focal length f of the lens system at the relative aperture of f/15. In accordance with convention, the radius of curvature of an optical surface is said to be positive if the center of curvature of the surface lies to the right of the surface, and negative if the center of curvature of the surface lies to the left of the surface. The "thickness" listed for a particular surface is the thickness of the lens element bounded on the left by the indicated surface, where the thickness is measured along the optical axis of the system. The thickness of each lens element is expressed as a multiple of the focal length f of the system. $N_e$ is the refractive index of the lens element bounded on the left by the indicated surface, where the value of the refractive index is given for the mercury e line, i.e., for a base wavelength of $\lambda_0 = 0.54607$ micron. $V_e$ is the Abbe number for the lens element at the same base wavelength. The "material" listed for each surface refers to the type of optical material used for making the lens element bounded on the left by the indicated surface.

FIG. 2 illustrates a cemented lens doublet according to the present invention. The design form for the cemented lens doublet of FIG. 2 is specified in tabular format as follows:

TABLE II

| Surface No. | Radius | Thickness | $N_e$ | $V_e$ | Material |
|---|---|---|---|---|---|
| 1 | .3243 f | .00750 f | 1.4350 | 95.06 | $CaF_2$ |
| 2 | −.3952 f | .0 | | | Air |
| 3 | −.3952 f | .00500 f | 1.5915 | 54.8 | IRGN6 |
| 4 | −11.2096 f | | | | | where the column headings are the same as for Table I, and where surface No. 2 of the $CaF_2$ crystal lens element coincides with surface No. 3 of the IRGN6 glass lens element.

Both the air-spaced doublet of FIG. 1 and the cemented doublet of FIG. 2 are corrected for lateral color as well as for spherical aberrations and spherochromatism. The design form for the air-spaced doublet is aplanatic, and is therefore also corrected for coma. The cemented doublet may be used in applications where correction for coma is not necessary, e.g., in collimating a point source.

The variation of paraxial marginal ray height with wavelength is substantially the same for the cemented doublet of FIG. 2 as for the air-spaced doublet of FIG. 1. Thus, a curve as shown in FIG. 3, which indicates the variation of paraxial marginal ray height (conventionally designated PY) with wavelength at a particular focal surface, viz., a focal surface located at approximately 0.9943 f from surface No. 4 (where f is the focal length of the doublet at the base wavelength $\lambda_0 = 0.54607$ micron), is substantially the same for the air-spaced doublet of FIG. 1 as for the cemented doublet of FIG. 2. The curve of FIG. 3 is called the "wavelength scan" of the lens doublet for paraxial marginal ray height at the focal surface located at a distance of approximately 0.9943 f from surface No. 4.

Color correction at a particular focal surface is achieved for those wavelengths at which the paraxial marginal ray height is zero, i.e., those wavelengths at which the wavelength scan curve for paraxial marginal ray height crosses the horizontal axis. For the focal surface at approximately 0.9943 f from surface No. 4, the lens doublet of the present invention is seen in FIG. 3 to be color-corrected (i.e., has zero paraxial marginal ray height) at four visible wavelengths and at one wavelength in the near-infrared region of the spectrum. For those wavelengths at which color correction is not achieved, the closeness of the wavelength scan curve to the horizontal axis is a measure of the residual chromatic aberration of the lens doublet at that focal surface.

The wavelength scan curve of FIG. 4 shows the variation of paraxial marginal ray height with wavelength for the lens doublet of FIG. 1 (and thus also for the lens doublet of FIG. 2) at another paraxial focal surface, viz., a focal surface located at a distance of approximately 0.9952 f from surface No. 4, where color correction is achieved for one visible wavelength and four near-infrared wavelengths.

The wavelength scan curve of FIG. 5 shows the variation of paraxial marginal ray height with wavelength for the lens doublet of FIG. 1 (and thus also for the lens doublet of FIG. 2) at yet another paraxial focal surface, viz., a focal surface located at a distance of approximately 0.9947 f from surface No. 4, where color correction is achieved at three wavelengths in the spectral band from 0.4 to 2.5 microns. The separation of the wavelength scan curve from the horizontal axis in FIG. 5 indicates that the blur due to chromatic aberration is of generally the same magnitude in the infrared as in the visible region of the spectrum.

The wavelength scans of FIGS. 3, 4 and 5 indicate that a lens doublet according to the present invention can be used as an imaging system in an instrument that is designed to operate in the infrared region of the spectrum and also to have the capability of being calibrated using visible light.

FIG. 6 schematically illustrates an instrument embodying a lens doublet 10 according to the present invention and also having means for simultaneously detecting images formed by the doublet 10 using visible and infrared wavelengths. For the focal surface as indicated by the wavelength scan of FIG. 3, five wavelengths (viz., four visible wavelengths and one near-infrared wavelengths) in a beam of optical radiation transmitted by the lens doublet 10 would, in the absence of any beam splitting device, come to a common focus at a focal surface 11. However, a beam splitter 12, which transmits visible radiation and which reflects infrared radiation, is positioned on the optic axis of the instrument between the doublet 10 and the focal surface 11. The beam splitter 12 reflects the infrared radition away from the original direction of the optic axis at an angle determined by the orientation of the beam splitter 12 with respect to the optic axis. With respect to the infrared region of the spectrum, the optic axis may be said to be "folded" at the reflecting surface of the beam splitter 12. The infrared wavelength that would come to a focus at the focal surface 11 in the absence of the beam splitter 12 is instead brought to a focus at a focal surface 11' on the "folded" optic axis. The focal surface 11' is symmetrically located with respect to the focal surface 11 about the reflecting surface of the beam splitter 12. A compensation plate 13 is positioned between the beam splitter 12 and the focal surface 11 to compensate for aberrations introduced by the beam splitter 12.

A detector 14 sensitive to visible radiation is placed at the focal surface 11, and a detector 14' sensitive to infrared radiation is placed at the focal surface 11'. The detectors at the focal surfaces 11 and 11' simultaneously detect images formed with the visible and infrared radiation. It is readily apparent that the beam splitter 12 could be replaced by a beam splitter that transmits infrared radiation and reflects visible radiation, in which case the detector of visible radiation would be placed at the focal surface 11' and the detector of infrared radiation would be placed at the focal surface 11.

This invention has been described above in terms of particular embodiments and applications. However, other embodiments and applications for the invention would be apparent to practitioners in the art of optical design upon perusal of the above description and the accompanying drawing. Therefore, the foregoing description is to be understood as illustrating the invention, which is defined by the following claims and their equivalents.

I claim:

1. A lens doublet comprising a first lens element and a second lens element, said first and second lens elements being made of different refractive materials, each of said refractive materials having a characteristic index of refraction, the indices of refraction of said refractive materials being related to each other so that color correction of said lens doublet at four discrete wavelengths is possible, said first and second lens elements being configured and disposed with respect to each other so that said lens doublet is simultaneously color-corrected for four visible wavelengths and one infrared wavelength at one focal surface, and for one visible wavelength and four infrared wavelengths at another focal surface.

2. The lens doublet of claim 1 having a design form that provides negligible residual color throughout a wavelength band from 0.4 micron to 2.5 microns.

3. The lens double of claim 1 wherein said first lens element is made of an optical material having a refractive index of approximately 1.435 and an Abbe number of approximately 95.06 at a base wavelength of 0.54607 micron, and wherein said second lens element is made of an optical material having a refractive index of approximately 1.592 and an Abbe number of approximately 54.8 at said base wavelength.

4. The lens doublet of claim 3 wherein said first lens element is made of calcium fluoride crystal.

5. The lens doublet of claim 3 wherein said second lens element is made of Schott IRGN6 glass.

6. An optical imaging system rotationally symmetric about an axis, said system comprising a lens doublet having a first lens element made of calcium fluoride crystal and a second lens element made of infrared transmitting glass identified as Schott INGN6 glass, calcium fluoride crystal and Schott IRGN6 glass having respecitve indices of refraction that are related to each other so that color correction of said lens doublet at four discrete wavelengths is possible, said lens doublet having a design form that causes a common focus at one focal surface for four visible wavelengths and one infrared wavelength and a common focus at another focal surface for one visible wavelength and four infrared wavelengths.

7. The optical imaging system of claim 6 wherein said first lens element is bounded by a first surface and by a second surface, and said second lens element is bounded by a third surface and by a fourth surface, said first and second lens elements being positioned so that said second surface of said first element is spaced apart from said third surface of said second element, said first surface having a positive radius of curvature of approximately 0.549 times the focal length of said doublet, said second surface having a negative radius of curvature of approximately 0.265 times the focal length of said doublet, said third surface having a negative radius of curvature of approximately 0.278 times the focal length of said doublet, said fourth surface having a negative radius of curvature of approximately 0.851 times the focal length of said doublet, said first lens element having a thickness of approximately 0.0075 times the focal length of said doublet, said second lens element having a thickness of approximately 0.0050 times the focal length of said doublet .

8. The optical imaging system of claim 6 wherein said first lens element is bounded by a first surface and by a second surface, and said second lens element is bounded by a third surface and by a fourth surface, said first and second lens elements being positioned so that said second surface of said first element is in contact with said third surface of said second element, said first surface having a positive radius of curvature of approximately 0.324 times the focal length of said doublet, said second surface having a negative radius of curvature of approximately 0.395 times the focal length of said doublet, said third surface substantially coinciding with said second surface, said fourth surface having a negative radius of curvature of approximately 11.21 times the focal length of said doublet, said first lens element having a thickness of approximately 0.0075 times the focal length of said doublet, said second lens element having a thickness of approximately 0.0050 times the focal length of said doublet.

9. An optical instrument comprising a doublet consisting of first and second lengs elements made of corresponding first and second refractive materials respectively, each of said first and second refractive materials having a characteristic index of refraction, the indices of refraction of said first and second refractive materials being related to each other so that color correction of said optical instrument for at least three discrete wavelengths is possible, said first and second lens elements being configured and disposed with respect to each other so that said optical instrument is simultaneously color-corrected for said three discrete wavelengths, whereby paraxial marginal rays passing through said doublet are brought to a common focus for said three wavelengths, at least a first one of said wavelengths being in the visible region of the electromagnetic spectrum and at least a second one of said wavelengths being in the infrared region of the electromagnetic spectrum, said optical instrument also comprising beamsplitting means for spatially separating an image formed by said first one of said wavelengths from an image formed by said second one of said wavelengths, said optical instrument thereby being calibratable for said infrared second wavelength by using said visible first wavelength.

10. The optical instrument of claim 9 further comprising means for simultaneously detecting images formed using visible and infrared wavelengths.

* * * * *